United States Patent [19]
Marshall

[11] 3,969,561
[45] July 13, 1976

[54] BIAXIALLY ORIENTED NONWOVEN FABRICS AND METHOD OF MAKING SAME

[75] Inventor: Preston F. Marshall, Walpole, Mass.

[73] Assignee: The Kendall Company, Boston, Mass.

[22] Filed: Sept. 17, 1974

[21] Appl. No.: 506,843

[52] U.S. Cl. .............................. 428/113; 428/114; 428/167; 428/171; 428/218
[51] Int. Cl.² ......................................... B32B 5/12
[58] Field of Search .................. 161/55, 57, 59, 60, 161/123, 124, 150; 428/105, 107, 113, 114, 167, 170, 171, 218, 156, 293, 294, 295

[56] References Cited
UNITED STATES PATENTS

| | | | |
|---|---|---|---|
| 2,705,692 | 4/1955 | Petterson | 161/55 |
| 3,193,436 | 7/1965 | Kalwaites | 161/57 |
| 3,310,454 | 3/1967 | Florio et al. | 161/123 |
| 3,516,899 | 6/1970 | Saunders | 161/150 |
| 3,681,184 | 8/1972 | Kalwaites | 428/156 |
| 3,682,756 | 8/1972 | Kalwaites | 428/156 |
| 3,705,070 | 12/1972 | Kim | 161/150 |
| 3,727,270 | 4/1973 | Marshall | 19/236 |
| 3,746,607 | 7/1973 | Harmon et al. | 264/288 |
| 3,816,231 | 6/1974 | Marshall | 161/141 |

*Primary Examiner*—Marion E. McCamish
*Assistant Examiner*—William R. Dixon, Jr.
*Attorney, Agent, or Firm*—Edward J. Scahill, Jr.

[57] ABSTRACT

A nonwoven fabric having alternating stripes of high fiber density and low fiber density is made in such a manner that substantially all of the fibers in the stripes of high fiber density are oriented in substantially one direction, for example the machine direction, while substantially all of the fibers in the adjacent stripes of low fiber density are oriented in a direction substantially normal to that direction. This phenomenon can be produced by passing a fluid-borne stream of discretely separated fibers over a set of finger-like striping bars that are disposed, equidistantly from each other, directly over a moving conveyor screen or by a set of impervious resist areas in the shape of bars, or the like, disposed directly on the moving screen. As the fluid-borne stream passes onto the section having the striping bars or resist areas, a majority of the fibers in the stream are attracted to the spaces between the bars and are generally disposed in an orientation that follows the direction of the striping bars, while a lesser number of fibers are disposed across the bars and remain in a generally cross direction to those bars after the thusly formed web of fibers moves entirely onto the moving conveyor screen. Some of the fibers in the fabric may advantageously be of a thermoplastic nature so that, when heated, they will provide a binder for the fabric.

8 Claims, 7 Drawing Figures

ONE-QUARTER SCALE VS FULL SCALE - BOTH AT 15 PSIG

BIAXIALLY ORIENTED NONWOVEN FABRICS AND METHOD OF MAKING SAME

BACKGROUND OF THE INVENTION

This invention relates to biaxially oriented striped nonwoven fabrics and the method and apparatus for making same, and more particularly, to a nonwoven fabric having alternating high fiber density and low fiber density striped portions wherein the low fiber density stripes are substantially oriented in one direction and the high fiber density stripes are substantially oriented in a direction normal to that direction.

Nonwoven fabrics are now used for a variety of purposes in a number of industries. These fabrics have been made traditionally by methods such as carding, garnetting, air-laying and the like. Nonwoven webs have been made to have most of the fibers therein oriented in the machine direction; other nonwoven webs have been made to have some cross orientation; and still other webs have been produced having a randomized fiber distribution. However, substantially all of these webs are lacking in any surface character or natural decorative effect. Nowhere in the art, heretofore, has a nonwoven fabric been made having a striped construction wherein half of the stripes have a high fiber density and the other half of the stripes are of low fiber density; furthermore, no fabrics have yet been made in such a striped manner, for example, wherein a majority of the fibers in the high fiber density stripes are oriented in a direction parallel to stripes (machine direction), while a majority of the fibers in the low fiber density stripes are oriented in a direction substantially perpendicular to the stripes (cross direction). No method has yet been devised for manufacturing such a fabric with at least two types of orientation simultaneously.

Accordingly, it is an object of this invention to produce a nonwoven fabric that has a striped patterned construction manufactured into it.

It is another object of this invention to produce a striped nonwoven fabric having alternating stripes of high fiber density and low fiber density.

It is a further object of the present invention to produce a striped nonwoven fabric having alternating high fiber density stripes and low fiber density stripes wherein a majority of the fibers in the high fiber density stripes are oriented in the machine direction while a majority of the fibers in the low fiber density stripes are oriented in the cross direction.

It is still a further object to produce a striped nonwoven fabric wherein the direction of the stripes are running across the fabric or at some other angle that is bias to the angle of the direction of travel of the fabric.

Still another object of the instant invention is to provide a method of manufacturing such a striped nonwoven fabric in a continuous operation.

SUMMARY OF THE INVENTION

Finger-like striping bars or impervious resist areas are disposed over or on a moving air-permeable conveyor in a manner that causes a fluid-borne stream of fibers, that is thrown thereupon, to form a nonwoven fabric having alternating stripes of high fiber density and low fiber density wherein substantially all of the fibers in the high fiber density stripes are oriented in the direction of the bars, and substantially all of the fibers in the low fiber density stripes are oriented in a direction substantially normal to that direction. As the fluid-borne stream passes onto the striping bars and moving screen, a majority of the fibers in the stream are attracted to the spaces between the bars and are generally disposed in an orientation that follows the direction of the moving conveyor screen, while a minority of fibers become disposed across the bars and remain in a generally cross direction after the thusly formed web of fibers moves entirely onto the moving conveyor screen. The striping bars or impervious resist areas on the screen have particular dimensions and are positioned at predetermined spaces to produce the above webs; however, the striping bars or resist areas and their placement may be altered to produce other similar structures, such as a fabric having a more raised or ribbed high fiber density stripe. Various other designs or patterns can be imparted to nonwoven fabrics using the basic principles outlined above.

DESCRIPTION OF THE PREFERRED EMBODIMENTS

Figure 1:
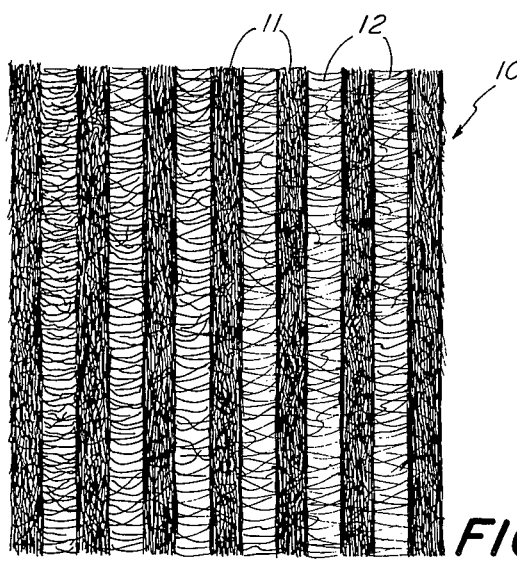
FIG. 1 is a plan view of a typical nonwoven fabric of this invention.

Referring to FIG. 1 of the drawings, there is shown a nonwoven fabric 10 having alternating high fiber density stripes 11 and low fiber density stripes 12. As can be seen in the drawing, the majority of the fibers in the high fiber density stripes 11 are oriented in a direction that substantially follows the direction of a moving conveyor belt upon which such a fabric is made (machine direction), that is to say, that those fibers are aligned substantially parallel to the length of the fabric. However, the majority of the fibers in the low fiber density stripes 12 are oriented in a direction that is substantially across the width of the fabric 10 (cross direction orientation), that is to say, these fibers are aligned substantially normal to the fibers in the high fiber density stripes 11. These alternating striped portions of varying orientation are formed simultaneously as described below.

Figure 2:
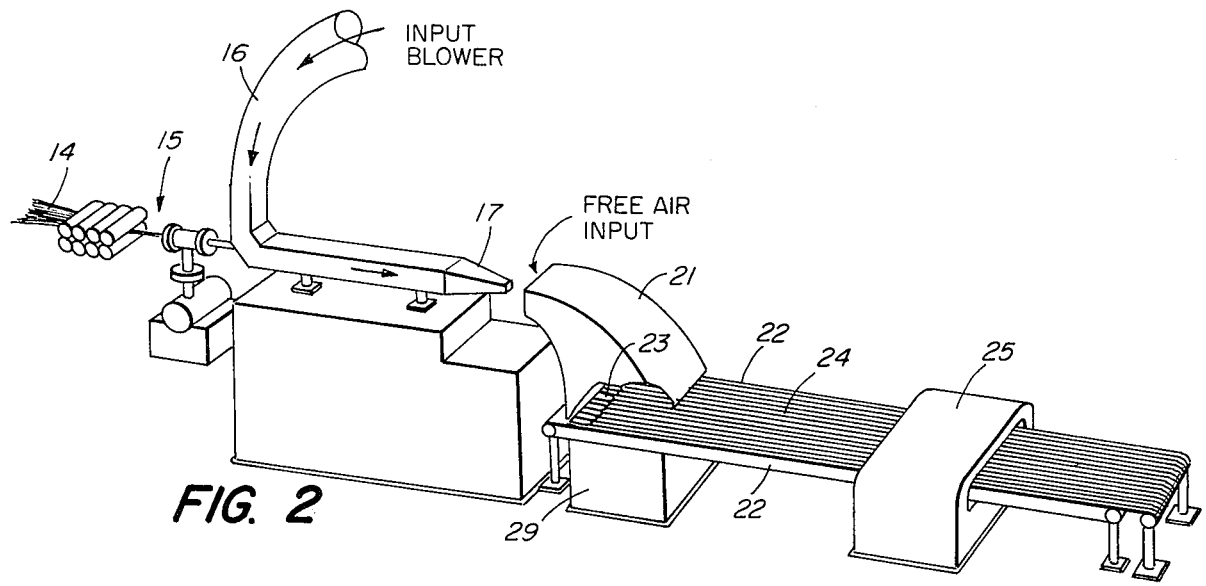
FIG. 2 is a perspective view of the apparatus used to make the nonwoven fabric in this invention.

As shown in FIG. 2, a fluid-borne stream of textile length fibers can be produced by an air lay such as the device described in my U.S. Pat. No. 3,727,270, wherein textile-length fibers 14 are drafted through a draw frame such as at 15 and are then propelled by a high velocity air stream provided by input blower 16. The fluid-borne stream of fibers is then guided through a venturi 17 and passed into a distributor chamber 21, further aided by free air pulled in from without the chamber 21. The fluid-borne stream of fibers passes through the chamber 21 and falls onto a moving conveyor screen 22. Finger-like striping bars 23 can be disposed at regular intervals across the width of the moving conveyor screen 22 in a permanent manner and a suction means, such as the suction box 29, can be positioned beneath the screen 22 and in the area of striping bars 23 so as to aid in causing the fluid-borne stream of fibers to be directed at the striping bars and so as to facilitate the simultaneous formation of crosswise and macrine-wise orientation of the fibers in the fluid-borne stream. As the fluid-borne stream of fibers falls on the striping bars and the screen they align themselves in a fashion that produces the nonwoven fabric described above. The thusly formed striped web 24 then proceeds to move along the screen 22 and may pass through a heating means, such as at 25, which can serve to cause a melting of thermoplastic fibers present within the web 24 so as to serve as a means for binding the fibers of the web together. Of course, the web may be bonded by any other conventional bonding means known to those skilled in the art of nonwoven fabrics. The web then continues until it is picked up by a takeup roll at the end of the line.

While it is not entirely certain what causes this novel striped fabric to be formed, one theory is now offered. However, it should be pointed out that this invention should not be limited by the theoretical explanation presented here. As the fluid-borne stream approaches the moving screen 22 propelled by a positive pressure induced velocity above the screen and a low pressure below the screen, the air must diverge to avoid the stripes positioned across the screen. This divergence would be centered along the center line of each striping bar and above that striping bar. The air along either side of that line of divergence would be induced to move outward from the center line of the striping bar. As a result, a fiber approaching the screen would be carried by this divergent air and would thus follow its divergence. If a fiber has a portion of its length on one side of the line of divergence and another portion of its length on the other side of the line of divergence, it will suffer a straightening action as its two portions on opposite sides on the line of divergence are forced outward from the striping bars 23. The fibers are then carried down to the moving screen 22 with one portion of the fiber on one side of the striping bar and another portion of the fiber on the other side of the bar. Bridging these two portions of the fiber will be a relatively straight section of fiber that bridges the striping bar at approximately 90° to its axis.

Accordingly, it then becomes apparent that it is desirable to have the width of the striping bar less than the length of the fiber to provide a bridging length and two portions of the fibers on either side of the striping bar. It has been noted, however, that there will still be some straightening action and cross orientation effected whenever a fiber bridges both sides of the line of divergence. Further, the striping bars should be of sufficient width so as to cause a divergence that is substantial when compared to a fiber length so as to have a substantial portion of the fiber length straight and oriented along the striping bar.

A majority of fibers, however, will be propelled toward the spaces between the striping bars and those fibers will be pulled forward along the moving screen 22 oriented substantially in a direction parallel to the striping bars 23, thereby producing a webbed fabric as shown and described in FIG. 1 above.

It has been found, for example, that a ⅜ inch wide striping bar produces a high degree of cross orientation with 1½ inch fibers, since it is a substantial width compared to a fiber length, but it is still small enough to permit a number of fibers to both bridge the striping bar and still have length remaining to distribute on either side of the striping bar. If the striping bars are close together so that the distance between the bars is less than a fiber length, and preferably less than one-half a fiber length, the fibers that do not bridge the striping bars will be carried into a high fiber density stripe or space that lies between the striping bars. As described earlier herein, a high fiber density stripe formed by a majority of the fibers is therefore induced to have a primary orientation along the axis of the striping bar. This most probably occurs because there is no restraint on the orientation of a fiber lying parallel to the axis of the stripe, but any fiber attempting to lie across the striping bars is pushed by the divergent air from the striping bars into a conformed position along the striping bar.

Under this theory, the high fiber density stripes that are formed between the blocking or resisting striping bars will be increasingly oriented in the direction of the stripe as the distance between the striping bars is decreased.

Figure 3:
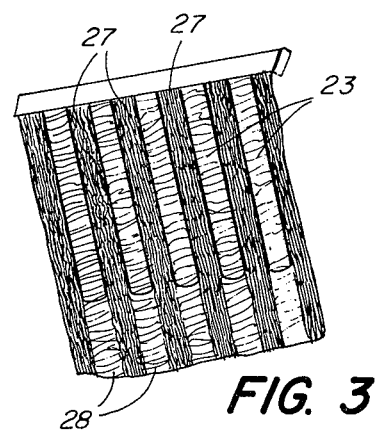
FIG. 3 shows a partial view of the striping bars used in this invention.

FIG. 3 is a close-up of the striping bars 23 and shows a majority of the fibers falling between the striping bars at 27 and being oriented in a direction that is substantially parallel to the striping bars 23. Simultaneously, a minority of the fibers become disposed across the striping bars so as to be oriented in a direction substantially across the width of the fabric, and normal to the axis of the bars, such as is shown at 28.

In all but the lightest weight fabrics, the top of the fabric, that is the portion of the fabric furthest removed from the conveyor screen, appears to be covered length of a minor portion of fibers positioned generally across the entire width of the webs. As the fluid-borne stream of fibers positions itself on the screen and striping bars, and becomes increasingly thick and passes off the striping bars, the falling fibers become less generally controlled by the diverging air, and then fall on the uppermost portions of the fabric in a somewhat randomized or cross oriented fashion (partly because some cross orientation is caused by the fluid-borne stream of fibers being thrown toward the forward wall of the curved chamber 21). The web at this point can best be described as having high and low fiber density stripes having a somewhat randomized covering layer of fibers integrated therewith. However, a majority of the fibers are still positioned in a striped fashion and in an orientation parallel to the length of the web.

If the striping bars are moved closer together and arranged so that they are spaced ¾ inch on center rather than on 1 inch centers as described herein earlier, it becomes apparent that a much more pronounced ribbed structure is formed. By "ribbed structure", it is meant that the high fiber density stripes have so many fibers therein that this portion of the web structure becomes almost semi-circular in its construction, while the low fiber density areas remains rather flat. This arrangement could well be described as being a wash-board configuration.

Figure 5:
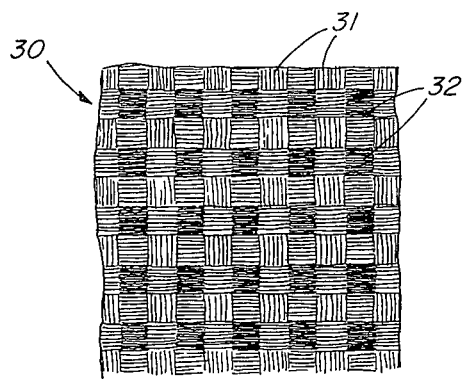
FIG. 5 shows a plan view of another embodiment of the nonwoven fabric of this invention.

Furthermore, two web fabrics may be superimposed one on top of the other in a manner that the stripes of one web 31 will be at substantially 90° to the stripes of the second web thereby forming a "plaid" fabric such as shown at 30 in FIG. 5. The fabrics of this invention have a variety of uses and could be used as disposable curtains or drapes, decorative narrow ribbons and/or florist ribbons; sweatbands, cling type bandages; disposable tablecloths, and the like.

Figure 6:
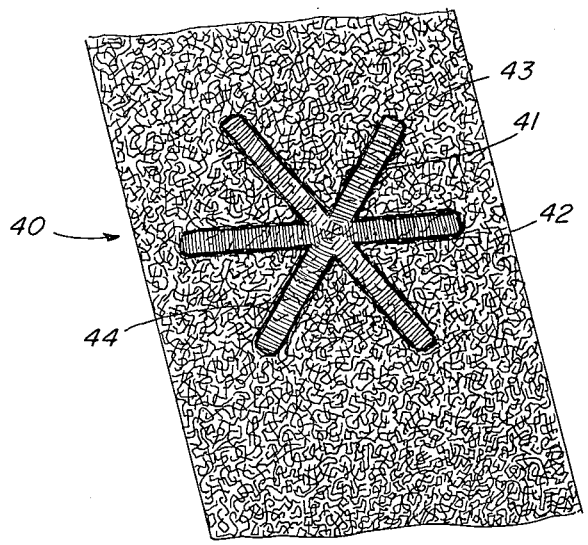
FIG. 6 shows another embodiment of the nonwoven fabric of this invention made with resist areas moving with the screen; and, FIG. 7 is a chart for showing the process steps and conditions for air-laying the web of this invention.

Of course, other designs of striping bars can be used in different arrangements to produce similarly biaxially oriented nonwoven fabrics. For example, impervious resist areas can be designed into the moving conveyor screen as a substitute for the striping bars. As shown in FIG. 6, resist areas 41 can be formed in the shape of a star, or the like, directly on the moving screen 42, so that as the portion of the screen carrying the resist areas passes under the curved chamber and over the suction box, the biaxial orientation of fibers will occur on and around the resist areas on the screen. The resist area 41 will have low fiber density areas 43 wherein the fibers are oriented in a direction substantially across each of the finger-like extensions on the star, while the area of the fabric web directly adjacent the resist area will have fibers oriented in a direction substantially parallel with the contours of the configuration of the resist area, and the fibers on the rest of the web not affected by resist areas will have a random, cross or machine orientation as desired. Other configurations could also be made on the screen to produce other similar biaxially oriented patterns thereof.

The above webs can be produced by passing fluid-borne streams of fibers through the apparatus outlined herein before by any method of air-laying fiber webs that is known to those skilled in the art, however, the preferred method is as follows:

Eight vacuum drafting jets of type C as described fully in my earlier patent U.S. Pat. No. 3,727,270, of common assignee, having a throat diameter of 0.562 inch were operated at 45 PSIG to 50 PSIG of compressed air at an air consumption of 60 SCFM per jet or at 15 PSIG at an air consumption of 30 SCFM per jet. The jets were supplied with a conventional second draw 60 grain sliver, and the sliver was fed from a conventional 4 over 4 draw frame set to a draft of 10.

The jets set on 5 inch centers were used to "seed" a column of blower air 40 inches wide and 4½ inches deep. At a distance of 40 inches downstream from the jet the 40 inch wide column of air was reduced by a venturi from 4½ inches deep to 2 inches deep to form a sheet of air travelling at 6,000 feet per minute or 3,333 CFM. This velocity can be adjusted to this level by means of controlling the output of the positive pressure blower.

After leaving the venturi, the sheet of air passed through an open space and was then fed into a distributor chamber or the like having a collection screen approximately 40 inches wide. A suction blower powered by a suction box under the collection screen was adjusted to collect approximately 4,000 CFM per inch of width. Since the suction system was removing more air than was being supplied by the venturi, that amount of free air from the room was drawn in the air gap between the venturi and the distributor. Such a machine operating in the above manner handles 18,000 pounds of air per hour or 4,000 CFM. All of the air but for the 240 CFM used in the jets at 15 PSIG, was supplied by blowers.

Figure 7:
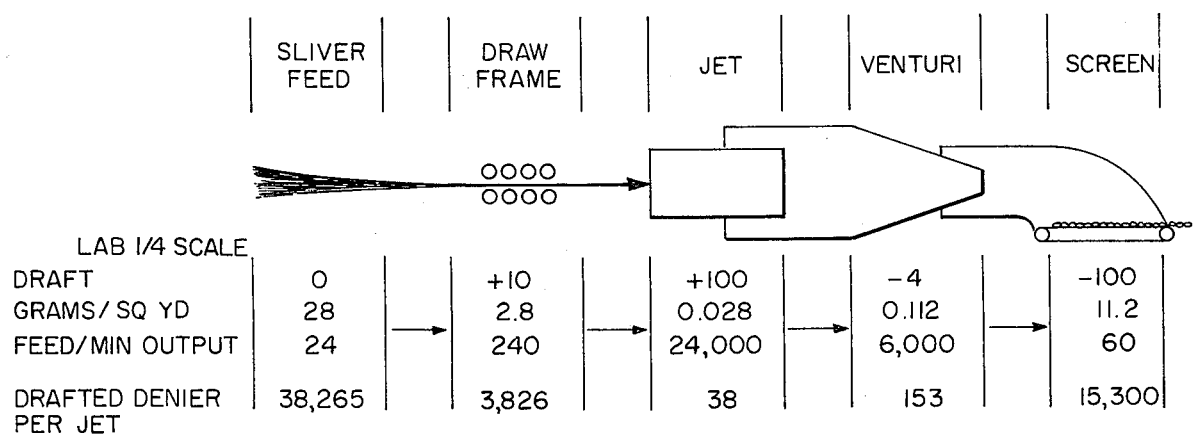

The operation of this airlaid system can be further shown by referring to FIG. 7 of the drawings by taking an example of a sliver feed rate of 24 feet per minute at the input end of the draw frame. In this case, the original sliver containing approximately 38,265 denier would be drawn down to 3,826 denier by the draw frame and would be about ¾ inch wide and travel at 240 feet per minute.

Assuming that the jet was operating at 15 PSIG it would accelerate the fibers to 24,000 feet per minute and reduce the sliver weight to an average of approximately 38 denier spread over the area of the jet exit 0.6 inch in diameter. This stream of fibers would be expanded and then fed to the venturi where it would contract to 153 denier spread over a venturi exit cross section of 10 square inches or 15.3 denier per square inch.

When eight ends of sliver at 24 feet per minute are fed (one to each jet) over the 40 inch width, the feed rate of the sliver to the machine is 28 grams per square yard and the exit rate at the venturi is 0.112 grams per square yard. The draft factors, in process web weights, and the velocities are outlined in FIG. 7.

The machine was operated on 3 denier and 1½ denier fibers of about 1½ inch length. The quality level areas observed the various rates of feed and the various jet pressures. From these experiments the generalized conditions for running these fibers were determined in the form of the ratios of pounds per hour, horsepower, air volume, etc. These generalized conditions can be shown on the following chart:

GENERALIZED CONDITIONS FOR AN AIRLAY DISTRIBUTOR

| (A) AT A REINFORCING GRADE QUALITY LEVEL | 3-Den. 1½" | 1½-Den. 1½" |
|---|---|---|
| Distributor Conditions | | |
| Number of Fibers/Cubic foot of air | 6,000 | 12,000 |
| Number of Fibers/Cubic inch of air | 3.5 | 7 |
| Lbs. of air/lb. of fiber | 450 | 450 |
| CFM of air/lb. of fiber per hour | 100 | 100 |
| Jet Conditions at 15 PSIG | | |
| Compressor HP per lb. of fiber/hour | 0.6 | — |
| Lbs. of fiber per hour per jet | 5 | — |
| Jet Conditions at 50 PSIG | | |
| Compressor HP per lb. of fiber/hour | — | 2 |
| Lbs. per fiber per hour per jet | — | 5 |
| (B) AT A GOOD QUALITY LEVEL | 3-Den. 1½" | 1½-Den. 1½" |
| Distributor Conditions | | |
| Number of Fibers/Cubic foot of air | 3,000 | 6,000 |
| Number of Fibers/Cubic inch of air | 1.75 | 3.5 |
| Lbs. of air/lb. of fiber | 900 | 900 |
| CFM of air/lb. of fiber per hour | 200 | 200 |
| Jet Conditions at 15 PSIG | | |
| Compressor HP per lb. of fiber/hour | 1.2 | — |
| Lbs. of Fiber per hour per jet | 2.5 | — |
| Jet Conditions at 50 PSIG | | |
| Compressor HP per lb. of fiber/hour | — | 4 |
| Lbs. of Fiber per hour per jet | — | 2.5 |

This invention will be further explained by means of the following examples:

EXAMPLE 1

Eight ends of 38,265 denier rayon sliver of 3 denier per filament 1½ inches long were fed into a fluid-borne stream through eight jet nozzles at an air pressure of approximately 17 PSIG. The rayon is fed into the stream at a rate of 24.9 grams per square yard and Vinyon fibers of 3 denier and ¼ inch in length (Vinyon is a trade name for a polymer of vinyl acetate and vinyl chloride by American Viscose) are simultaneously fed therein by a ninth jet at a rate of 17.1 grams per square yard giving a total weight of 42.0 grams per square yard. The stream passes into a curved chamber and the stream of fibers is thrown onto a moving conveyor screen having finger-like striping bars equidistantly disposed from each other across the 42 inch width of the conveyor screen. The striping bars are 3/8 inch wide and are located on 1 inch centers. Forty-two stripes result from this particular web. In this particular example the suction under the screen was 2.5 inches of water. The web was then processed into a nonwoven by passing the web through an oven at 420°F.

EXAMPLE 2

The same fluid-borne stream of fibers as described in Example 1 was fed through the same equipment at 17 PSIG, and thrown onto the screen under which a suction box or the like exerted a pressure of 2 inches of water. The rayon is fed at a rate of 14.0 grams per square yard while the Vinyon is fed at a rate of 9.0 grams per square yard giving a total fabric weight of 23 grams per square yard. This fabric is also run through an oven at approximately 420°F, and a finished nonwoven fabric is produced thereby having 42 stripes thereon.

EXAMPLE 3

The fluid-borne stream as described in Example 1 was prepared and run through the same apparatus as described therein at 17 PSIG. The rayon was fed at a rate of approximately 28 grams per square yard while the Vinyon was fed at approximately 35 grams per square yard giving a total fabric weight of 63 grams per square yard. The fabric was once more passed through an oven at 420°F producing a rather heavy and somewhat boardly striped fabric having 42 stripes thereon.

EXAMPLE 4

The fluid-borne stream described in Example 1 is passed into the curved chamber described therein at 17 PSIG. The striping bars, however, still 3/8 inch wide, were placed on 3/4 inch centers over a width of 42 inches. A striped fabric was formed having 56 stripes thereon and wherein the heavy fiber density stripes are raised above the plane of the fabric so as to form a ribbed structure thereon.

Figure 4:
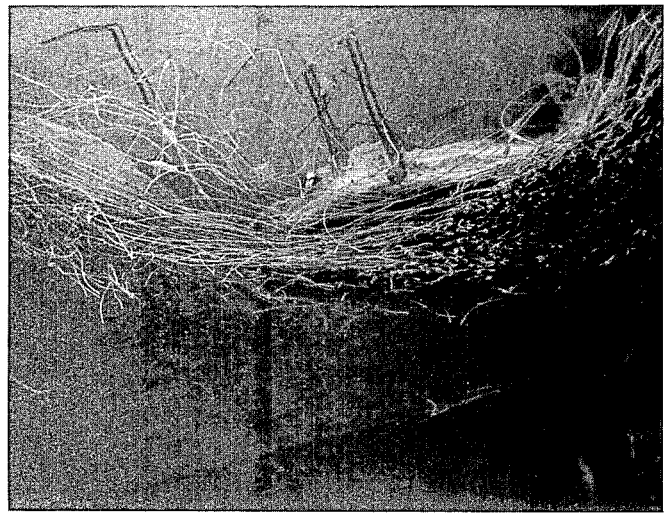
FIG. 4 is a photomicrograph of a sectional view of nonwoven fabric of this invention taken at the interface of a high fiber density stripe and a low fiber density stripe.

It is to be understood that many variations of the fabric described herein can be formed by varying the width of the striping bars, the shape of the bars or resist areas, and the distances between same. Also, the speed of the moving conveyor (the weight of the fabric) may also alter the characteristics of the web. For example, and as was discussed earlier, a somewhat heavier weight web will have a layer of generally randomized or cross oriented fibers across the uppermost portion of the web fabric. This can be shown by reference to FIG. 4 of the drawings. FIG. 4 is a photomicrograph taken on an AMR-1000 Scanning Electron Microscope made by AMR Corporation, Burlington, Mass. This photomicrograph, taken at the interface between a low fiber density stripe and a high fiber density stripe, shows that the fibers in the low fiber density stripes are substantially cross machine oriented, that the fibers in the high fiber density stripes are substantially machine direction oriented, and the fibers in the uppermost portion of the fabric extend beyond the interface and are somewhat cross oriented onto the high fiber density stripe portion. However, it can also be seen that a majority of the fibers are located in the high fiber density stripe and are oriented at approximately 90° to the orientation of the low fiber density fibers.

Many other designs could be achieved using the methods described above by also varying the placement of the striping bars so as to be directly on the collection screen as described above or to be of a more stationary nature and be positioned over the screen. Either will produce various fiber patterns in the area that is covered by the striping bars or resist areas that is highly oriented in a direction substantially normal to the axis of the striping bar.

Optimum results can be obtained when the striping bars have a width of less than a fiber length but of more than one-eighth inch. A width of three-eighths inch has been found to be particularly preferable using 1½ inch long fibers of 1½ and 3 denier.

If the length of the striping bars blocking the screen is reduced so that they do not extend so far as to cover the entire screen collecting surface, then a substantially random web will be formed on the unblocked collection surface causing a random web to become superimposed over and integrally connected with the striped web. The proportion of web weight that is striped and has been biaxially oriented, to the proportion of superimposed web that is random can, of course, be varied by adjusting the proportion of the screen that is blocked by the striping bars.

The striping bars described as preferred in this invention can, of course, be replaced, as described earlier herein, by placing resist areas of impermeability on the screen in the form of bars, or the like. This may be accomplished by placing, for example, strips of tape across the screen or by blocking the openings in the screen in selected areas with a plastic or paint. If these bars are positioned so as to be along the screen's direction of travel, then the resulting striped fabric will be as described in the examples above. However, if the bars are placed across the width of the screen, then the pattern will be reversed so that the stripes will be disposed across the width of the fabric.

Of course, as stated and described herein earlier, resist areas may also be placed at any other angles, other than parallel or normal to the direction of travel of the screen to produce fabrics with stripes at a bias to the direction of travel of the fabrics.

Since it is obvious that many modifications and embodiments can be made in the above described invention without changing the spirit and scope of the invention, it is intended that this invention not be limited by anything other than the appended claims.

What is claimed is:

1. A biaxially oriented nonwoven fabric of textile-length fibers comprising:
    an unlayered nonwoven web having adjacent areas of low fiber density and areas of high fiber density thereon, a majority of the fibers in said low fiber density areas having a particular configuration and being uniformly distributed therein and oriented in a direction substantially normal to the axis of said configuration and, a majority of the fibers in the high fiber density area that lies directly adjacent said low fiber density areas being uniformly distributed therein and oriented in a direction substantially parallel with the contours of said configuration of the low fiber density area.

2. The biaxially oriented nonwoven fabric of claim 1 wherein said areas of high fiber density and low fiber density are alternating stripes of high fiber density and low fiber density, said stripes running along the length of said fabric, a majority of the fibers in said low fiber density stripes being oriented in a substantially cross machine direction and a majority of the fibers in said high fiber density stripes being oriented in a direction substantially parallel to said low fiber density stripes.

3. The nonwoven fabric of claim 2 wherein said stripes of high fiber density are raised above the plane of the fabric on only one side thereof.

4. The nonwoven fabric of claim 2 including having fibers disposed in a generally cross machine oriented manner across the top of said fabric.

5. The nonwoven fabric of claim 2 including having fibers disposed in a randomized manner across the top of said fabric.

6. The nonwoven fabric of claim 2 wherein another striped fabric is superimposed on the other in a manner such that the stripes of one fabric are disposed at approximately 90° to the stripes of said other fabric.

7. The nonwoven fabric of claim 2 wherein each alternating stripe of high fiber density includes area having substantially cross machine oriented fibers therein extending across from said low fiber density stripes, some of said cross oriented fibers extending under said high fiber density areas, and some of said cross oriented fibers extending across the top of said high fiber density areas.

8. The nonwoven fabric of claim 2 wherein said fibers include rayon and a polymer of vinyl acetate and vinyl chloride.

* * * * *